(12) United States Patent
Tao et al.

(10) Patent No.: US 12,633,147 B2
(45) Date of Patent: May 19, 2026

(54) METHOD FOR RECOGNIZING TEXT, AND APPARATUS

(71) Applicant: Jingdong Technology Information Technology Co., Ltd., Beijing (CN)

(72) Inventors: Dacheng Tao, Beijing (CN); Yue He, Beijing (CN)

(73) Assignee: Jingdong Technology Information Technology Co., Ltd., Beijing (CN)

( * ) Notice: Subject to any disclaimer, the term of this patent is extended or adjusted under 35 U.S.C. 154(b) by 335 days.

(21) Appl. No.: 18/567,243

(22) PCT Filed: Apr. 6, 2022

(86) PCT No.: PCT/CN2022/085317
§ 371 (c)(1),
(2) Date: Dec. 5, 2023

(87) PCT Pub. No.: WO2022/257578
PCT Pub. Date: Dec. 15, 2022

(65) Prior Publication Data
US 2024/0273932 A1 Aug. 15, 2024

(30) Foreign Application Priority Data
Jun. 7, 2021 (CN) .......................... 202110632180.5

(51) Int. Cl.
*G06V 30/19* (2022.01)
*G06F 40/40* (2020.01)
(Continued)

(52) U.S. Cl.
CPC ........ *G06V 30/19127* (2022.01); *G06F 40/40* (2020.01); *G06V 10/774* (2022.01);
(Continued)

(58) Field of Classification Search
CPC ........... G06V 30/19127; G06V 10/774; G06V 10/82; G06V 30/153; G06V 30/1918;
(Continued)

(56) References Cited

U.S. PATENT DOCUMENTS

2021/0192364 A1 6/2021 Wang et al.
2021/0232847 A1 7/2021 Yue

FOREIGN PATENT DOCUMENTS

CN 106022363 A 10/2016
CN 108549893 A 9/2018
(Continued)

OTHER PUBLICATIONS

Machine translation for CN 111027563 (Year: 2019).*
(Continued)

*Primary Examiner* — Qian Yang
(74) *Attorney, Agent, or Firm* — Nixon Peabody LLP

(57) ABSTRACT

A method for recognizing a text, and an apparatus. A specific embodiment of the method comprises: obtaining feature maps, the feature maps being obtained by means of performing text instance segmentation on an image having a text to be recognized; constructing a relationship graph according to the feature maps, wherein in the relationship graph, each node represents a pixel in a feature map, and each edge represents that a similarity measure of spatial semantic features of two connected nodes is greater than a target threshold, and a spatial semantic feature of a node comprises a type feature and a position feature of a pixel represented by the node; utilizing a pre-trained graph convolutional network to perform processing on the relationship graph, and obtaining a first text feature corresponding to the image; and generating a text recognition result for the image according to the first text feature.

18 Claims, 8 Drawing Sheets

200

(51) Int. Cl.

| | | |
|---|---|---|
| *G06V 10/774* | (2022.01) | |
| *G06V 10/82* | (2022.01) | |
| *G06V 30/148* | (2022.01) | |

(52) U.S. Cl.
CPC ............ *G06V 10/82* (2022.01); *G06V 30/153* (2022.01); *G06V 30/1918* (2022.01)

(58) Field of Classification Search
CPC ...... G06V 10/26; G06V 10/74; G06V 10/764; G06V 20/62; G06V 30/148; G06V 30/19; G06F 40/40; G06F 40/30; G06N 3/04; G06N 3/08
See application file for complete search history.

(56) References Cited

FOREIGN PATENT DOCUMENTS

| | | | |
|---|---|---|---|
| CN | 108549983 | A | 9/2018 |
| CN | 111814508 | * | 4/2019 |
| CN | 111027563 | * | 12/2019 |
| CN | 110659640 | A | 1/2020 |
| CN | 111209398 | A | 5/2020 |
| CN | 111783760 | * | 6/2020 |
| CN | 111414913 | A | 7/2020 |
| CN | 112487189 | A | 3/2021 |
| KR | 20210038430 | A | 4/2021 |
| WO | WO 2020/254924 | A1 | 12/2020 |

OTHER PUBLICATIONS

Machine translation for CN 111783760 (Year: 2020).*
Machine translation for CN 111814508 (Year: 2019).*

Elgammal et al., "A Graph-Based Segmentation and Feature Extraction Framework for Arabic Text Recognition", Proceedings of Sixth International Conference on Document Analysis and Recognition (Year: 2001).*

Pezeshk et al. "Automatic Feature Extraction and Text Recognition From Scanned Topographic Maps", IEEE Transactions on Geoscience and Remote Sensing, vol. 49, No. 12, Dec. 2011 (Year: 2011).*

Yi et al. "Scene Text Recognition in Mobile Applications by Character Descriptor and Structure Configuration", IEEE Transactions on Image Processing, vol. 23, No. 7, Jul. 2014 (Year: 2014).*

Yue He et al.; "Visual Semantics Allow for Textual Reasoning Better in Scene Text Recognition"; Thirty-Sixth AAAI Conference on Artificial Intelligence (AAAI-22); arXiv:2112.12916v1; Dec. 24, 2021 (9 pages).

Yiding Yang et al.; "Distilling Knowledge from Graph Convolutional Networks"; 2020 IEEE/CVF Conference on Computer Vision and Pattern Recognition (CVPR); arXiv:2003.10477v4; Jan. 10, 2021 (10 pages).

Xin Wan; Question-Guided Attention Reasoning Mechanism for Visual Question Answering: A Master Thesis submitted to University of Electronic Science and Technology of China; Jun. 2020; retrieved from https://www.doc88.com/p-59599030079861.html?r=1 (72 pages).

China National Intellectual Property Administration; International Search Report of International Searching Authority for International Patent Application No. PCT/CN2022/085317, mailed Jun. 17, 2022, with English language translation (6 pages).

Du, Chen et al.; "TextEdge: Multi-oriented Scene Text Detection via Region Segmentation and Edge Classification"; 2019 International Conference on Document Analysis and Recognition (ICDAR), Feb. 3, 2020; DOI: 10.1109/ICDAR.2019.00067 (6 pages).

Yao, Liang et al.; "Graph Convolutional Networks for Text Classification"; Thirty-Third AAAI Conference on Artificial Intelligence (AAAI-19), Jul. 17, 2019; arXIV:1809.05679v3 (9 pages).

* cited by examiner

700

800

METHOD FOR RECOGNIZING TEXT, AND APPARATUS

CROSS-REFERENCE TO RELATED APPLICATIONS

This application is a national stage of International Application No. PCT/CN2022/085317, filed on Apr. 6, 2022, which claims the benefit of and priority to Chinese Patent Application No. 202110632180.5, filed with the China National Intellectual Property Administration (CNIPA) on Jun. 7, 2021, each of which is hereby incorporated by reference herein in its entirety.

TECHNICAL FIELD

Embodiments of the present disclosure relate to the field of computer technology, in particular, to a method and apparatus for recognizing a text.

BACKGROUND

Existing text recognition may be divided into two categories, one is OCR (Optical Character Recognition) and the other is STR (Scene Text Recognition). Here, OCR usually refers to the recognition of text in high-quality scanned document images, and STR usually refers to the recognition of text in natural scene images.

Typically, a recognition scene of OCR has a simple image background, neatly arranged text, and standardized font, etc., while a recognition scene of STR has a more complex image background, randomly arranged text, and diverse fonts. Therefore, a recognition difficulty in STR is much greater than that of OCR.

STR has important utility in many fields such as assisting navigation with visual impairments, autonomous driving applications, text reading and translation in augmented reality, and has attracted increasing attention in the computer vision community. Current recognition methods for STR usually locate a text area from an image first, and then recognize text in the text area.

SUMMARY

Embodiments of the present disclosure propose a method and apparatus for recognizing a text.

In a first aspect, an embodiment of the present disclosure provides a method for recognizing a text, the method including: acquiring feature maps, the feature maps being obtained by means of performing text instance segmentation on an image of a to-be-recognized text; constructing a relationship graph according to the feature maps, where in the relationship graph: each node represents a pixel in a feature map, each edge represents that a similarity of spatial semantic features of two nodes connected by the edge is greater than a target threshold, and a spatial semantic feature of a node comprises a position feature and a type feature of a pixel represented by the node; processing the relationship graph using a pre-trained graph convolutional network, to obtain a first text feature corresponding to the image; and generating a text recognition result of the image based on the first text feature.

In a second aspect, an embodiment of the present disclosure provides an apparatus for recognizing a text, the apparatus includes: a feature map acquisition unit, configured to acquire feature maps, the feature maps being obtained by means of performing text instance segmentation on an image of a to-be-recognized text; a relationship graph construction unit, configured to construct a relationship graph according to the feature maps, wherein in the relationship graph: each node represents a pixel in a feature map, each edge represents that a similarity of spatial semantic features of two nodes connected by the edge is greater than a target threshold, and a spatial semantic feature of a node comprises a position feature and a type feature of a pixel represented by the node; a graph convolutional processing unit, configured to process the relationship graph using a pre-trained graph convolutional network, to obtain a first text feature corresponding to the image; and a recognition unit, configured to generate a text recognition result of the image based on the first text feature.

In a third aspect, an embodiment of the present disclosure provides an electronic device, the electronic device includes: one or more processors; and a storage apparatus, storing one or more programs thereon, the one or more programs, when executed by the one or more processors, cause the one or more processors to implement the method according to any one of the implementations described in the first aspect.

In a fourth aspect, an embodiment of the present disclosure provides a computer readable medium, storing a computer program thereon, where, the program, when executed by a processor, implements the method according to any one of the implementations described in the first aspect.

BRIEF DESCRIPTION OF THE DRAWINGS

Other features, objectives and advantages of the present disclosure will become more apparent, by reading detailed description of non-limiting embodiments with reference to the following accompanying drawings.

DETAILED DESCRIPTION OF EMBODIMENTS

Embodiments of the present disclosure are described in further detail below in connection with the accompanying drawings. It may be understood that embodiments described herein are only for the purpose of explaining the relevant disclosure, and are not a limitation of the disclosure. It should also be noted that, for ease of description, only parts related to the relevant disclosure are shown in the accompanying drawings.

Figure 1:
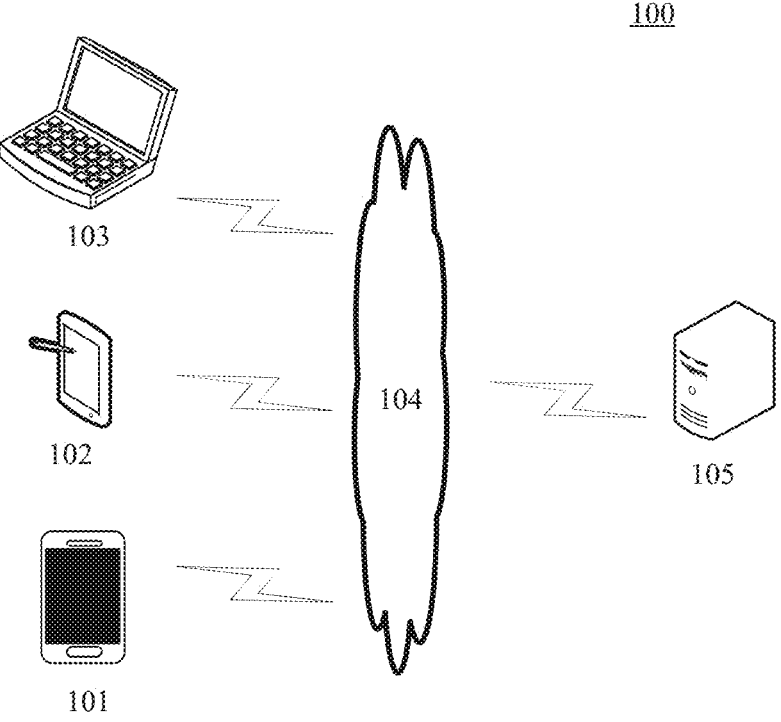
FIG. 1 is an example system architecture diagram to which an embodiment of the present disclosure may be applied.

It should be noted that embodiments and features in the embodiments in the present disclosure may be combined with each other on a non-conflict basis. Embodiments of the present disclosure will be described in detail below with reference to the accompanying drawings. FIG. 1 illustrates an example architecture 100 of a method for recognizing a text or an apparatus for recognizing a text to which embodiments of the present disclosure may be applied.

As shown in FIG. 1, the system architecture 100 may include terminal device(s) 101, 102, 103, a network 104, and a server 105. The network 104 serves as a medium providing a communication link between the terminal device(s) 101, 102, 103, and the server 105. The network 104 may include various types of connections, such as wired, wireless communication links or optical fibers.

The terminal device(s) 101, 102, 103 interact with the server 105 via the network 104 to receive or send messages, etc. The terminal device(s) 101, 102, 103 may be installed with various client applications, such as browser applications, search applications, image processing applications, or deep learning frameworks.

The terminal devices 101, 102, 103 may be hardware or software. When the terminal devices 101, 102, 103 are hardware, they may be a variety of electronic devices including, but not limited to, smartphones, tablet computers, e-book readers, laptop computers, and desktop computers. When the terminal devices 101, 102, 103 are software, they may be installed in the electronic devices listed above. The terminal devices 101, 102, 103 may be implemented as a plurality of software or software modules (e.g., software or software modules used to provide distributed services), or as a single software or software module, which is not limited herein.

The server 105 may be a server that provides various services, such as a server that provides back-end support for client applications installed on the terminal device(s) 101, 102, 103. The server 105 may be hardware or software. When the server 105 is hardware, it may be implemented as a distributed server cluster consisting of multiple servers, or as a single server. When the server 105 is software, it may be implemented as a plurality of software or software modules (e.g., a plurality of software or software modules for providing distributed services), or as a single software or software module, which is not limited herein.

It should be noted that the method for recognizing a text provided by embodiments of the present disclosure is generally performed by the server 105, correspondingly, the apparatus for recognizing a text is generally provided in the server 105.

It should also be noted that the terminal device(s) 101, 102, 103 may also be installed with image processing applications, and the terminal device(s) 101, 102, 103 may also process an image having a to-be-recognized text based on the image processing applications. In this case, the method for recognizing a text may also be performed by the terminal device(s) 101, 102, 103, and accordingly, the apparatus for recognizing a text may also be provided in the terminal device(s) 101, 102, 103. In this case, the example system architecture 100 may not include the server 105 and the network 104.

It should be understood that the numbers of terminal devices, networks, and servers in FIG. 1 are only illustrative. Depending on implementation needs, there may be any number of terminal devices, networks, and servers.

The method and apparatus for recognizing a text provided by the embodiments of the present disclosure, acquire feature maps, the feature maps being obtained by means of performing text instance segmentation on an image of a to-be-recognized text, then use pixels in the feature maps as nodes, establish edges based on a similarity of spatial semantic features of the nodes, so as to construct a corresponding relationship graph of the feature maps, then process the relationship graph using a graph convolutional network to extract a first text feature of the to-be-recognized text in the image, and then generate a text recognition result of the image using the first text feature. This graph-based text recognition method may take into account two-dimensional spatial information of the text in the image, avoiding ignoring of the two-dimensional spatial information caused by direct compression of text features in the image into one-dimensional features, which helps to improve a text recognition effect.

Figure 2:
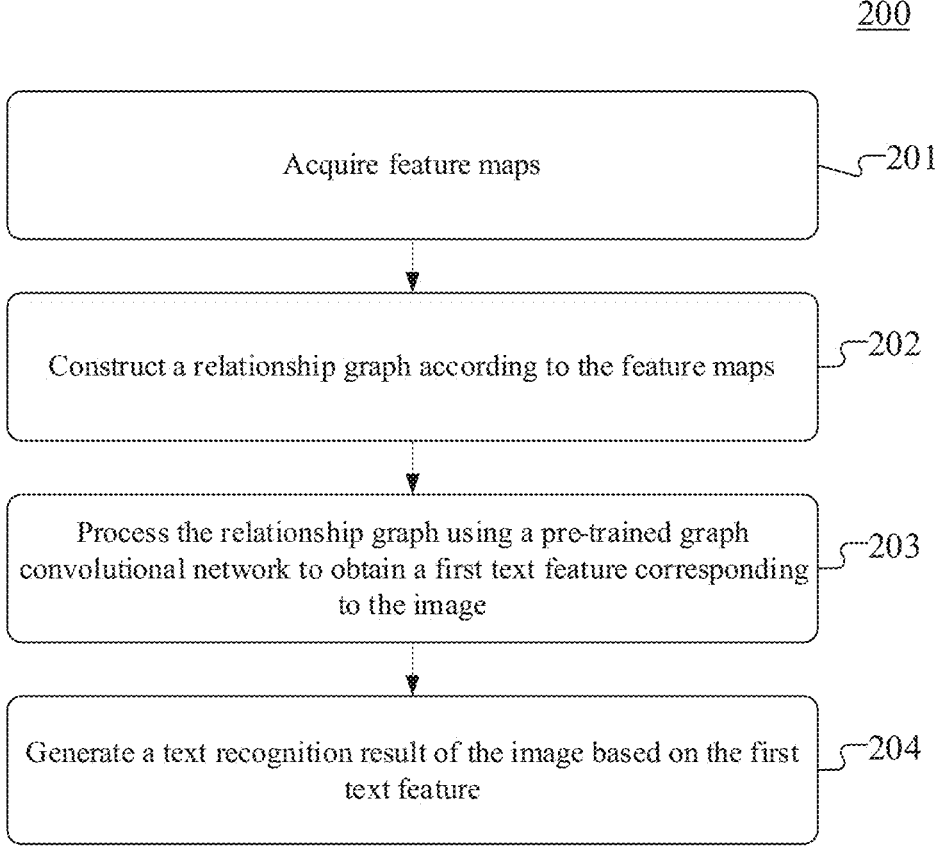
FIG. 2 is a flowchart of a method for recognizing a text according to an embodiment of the present disclosure.

With further reference to FIG. 2, illustrating a flow 200 of a method for recognizing a text according to an embodiment of the present disclosure. The method for recognizing a text includes the following steps:

Step 201, acquiring feature map(s).

In the present embodiment, the feature map(s) may be obtained by means of performing text instance segmentation on an image of a to-be-recognized text. Here, the to-be-recognized text may be text of various contents. For example, the to-be-recognized text may include one or more types of text (e.g., letters, numbers, special symbols, Chinese characters, etc.). The image of the to-be-recognized text may be of various types.

Depending on an actual application scenario, the quality of the image of the to-be-recognized text may be different, and a position, writing style, and various other attributes of the to-be-recognized text appearing in the image may be different.

Text instance segmentation may refer to detecting words included in a to-be-recognized text from the image and distinguishing the words. Generally, the feature map (MASK) obtained after text instance segmentation may correspond to a word included in the recognized text. The number of feature maps may be flexibly set according to the actual application scenario. For example, if the to-be-recognized text in the image includes only one word, the number of feature map may be one.

Alternatively, the number of feature maps is at least two. Alternatively, the number of feature maps may be pre-specified by those skilled in the art. Generally, the number of words included in the to-be-recognized text in the image may be estimated according to the actual application scenario, and the number of feature maps set may be larger than the estimated number of words to avoid situations such as missed recognition.

In particular, text instance segmentation on the image of the to-be-recognized text may be performed by the above executing body or other electronic device using various existing instance segmentation methods, to obtain the feature map(s).

In the present embodiment, the executing body (such as the server 105 shown in FIG. 1) of the method for recognizing a text may locally pre-store the feature map(s) obtained by means of performing text instance segmentation on the image of the to-be-recognized text, and then the executing body may directly acquire the feature map(s) from the local storage. The executing body may also acquire the feature map(s) from other storage devices (such as connected databases, third-party data platforms, the terminal device(s) 101, 102, 103 shown in FIG. 1).

Step 202, constructing a relationship graph according to the feature map(s).

In the present embodiment, after obtaining a feature map, pixels in the feature map may be used as nodes respectively, and an edge may be constructed based on a similarity between spatial semantic features of pixels, so as to obtain the relationship graph constructed based on the feature map(s).

The spatial semantic feature of a pixel may include a position feature and a type feature of the pixel. The position feature of the pixel may be used to indicate a position of the pixel in the feature map. The type feature of the pixel may be used to indicate a word type of the pixel.

The word type may be pre-set according to the actual application scenario. For example, if the to-be-recognized text is a number, 11 word types may be obtained by pre-dividing, for representing 0-9 and the background respectively.

Generally, the position feature of a pixel may be represented using coordinates (e.g., horizontal and vertical coordinates) of the pixel in the feature map. The type feature of the pixel may be represented by a vector, the vector may represent probabilities that the pixel belongs to the respective preset word types.

In constructing the relationship graph, if the similarity of spatial semantic features of two pixels is greater than a target threshold, an edge may be established between the two pixels. Conversely, if the similarity of spatial semantic features of two pixels is not greater than the target threshold, an edge is not established between the two pixels. Here, the target threshold may be pre-set by those skilled in the art or may be flexibly determined in the relationship graph establishment. For example, the target threshold may be determined based on the similarities of spatial semantic features between every two of the pixels.

The similarity of spatial semantic features may be determined flexibly by various methods. For example, a similarity of position features of two pixels and a similarity of type features of the two pixels may be calculated respectively, and then the weighted sum of the similarity of position features and the similarity of type features may be calculated and used as the similarity of spatial semantic features of the two pixels.

Alternatively, when the number of feature map(s) is at least two, a corresponding relationship subgraph may be constructed for each feature map, and then the relationship subgraphs corresponding to the feature maps may be merged to obtain the final relationship graph. The merging of the relationship subgraphs may be realized by sequentially connecting the relationship subgraphs according to a positional relationship of the feature maps correspondingly in the image. In particular, for two relationship subgraphs, a node may be selected from each of the two relationship subgraphs respectively for connection, to realize connection of the two relationship subgraphs. The method for selecting a node from a relationship subgraph may be set flexibly, such as selecting a root node.

Step 203, processing the relationship graph using a pre-trained graph convolutional network, to obtain a first text feature corresponding to the image.

In the present embodiment, Graph Convolutional Networks (GCN) may generally be viewed as a spectral convolution operation model that uses the Chebyshev first-order polynomial approximation of the graph Laplace matrix. From the perspective of spectral graph convolution, graph convolutional networks may be viewed as a special form of graph Laplace smoothing. The convolution operation of the graph convolutional networks may be viewed as sending feature information of each node to neighboring nodes of that node after transformation, and then fusing feature information of the neighboring nodes in order to update the feature information of each node.

In particular, after updating the feature information (i.e., spatial semantic feature) of each node using the graph convolutional networks, the updated feature information of each node may be used to generate the first text feature corresponding to the image using various methods. The first text feature may be used to represent features of the to-be-recognized text in the image.

For example, the feature information of nodes may be processed, such as averaging the feature information of the nodes or finding the maximum one in the feature information of the nodes, and then a result of the processing may be used as the first text feature. Another example is that the updated feature information of a node corresponding to a target pixel in the feature map may be selected and used as the first text feature, where the target pixel may be set flexibly.

As an example, the target pixel may be pre-specified by those skilled in the art, e.g., the target pixel may be a geometric center point of the feature map. As yet another example, the target pixel may be a pixel where a similarity between a node corresponding to the pixel and each of the neighboring nodes is greater than a preset threshold.

Step 204, generating a text recognition result of the image based on the first text feature.

In the present embodiment, after obtaining the first text feature, various existing text recognition methods (such as text recognition methods based on recurrent neural networks and join-time classifiers) may be used to generate a text recognition result corresponding to the first text feature, which is used as the text recognition result corresponding to the image of the to-be-recognized text.

In some alternative implementations of the present embodiment, a feature map obtained by means of performing text instance segmentation on the image of the to-be-recognized text may represent image feature of an image area in which a word in the to-be-recognized text is located and a sequential feature between the feature map and other feature maps. The sequential feature may represent a sequential relationship between feature maps, so that in subsequent recognition, recognition may be performed more accurately combining the context of each word, which helps to improve an accuracy of the recognition result.

Figure 3:
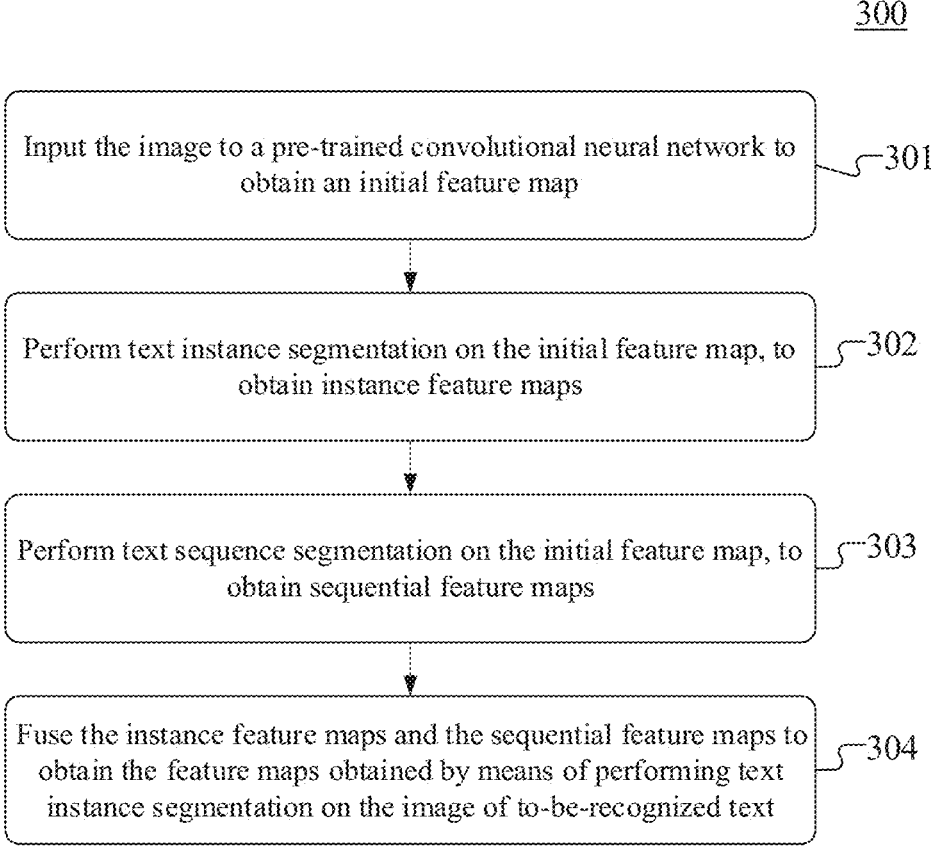
FIG. 3 is a flowchart of a method for generating a feature map in the method for recognizing a text according to an embodiment of the present disclosure.

With further reference to FIG. 3, illustrating a flow 300 of a method for generating a feature map in the method for recognizing a text according to an embodiment of the present disclosure. As shown in FIG. 3, a feature map obtained by means of performing text instance segmentation on an image of a to-be-recognized text may be generated through the following operations:

Step 301, inputting the image to a convolutional neural network trained in advance to obtain an initial feature map.

In the present embodiment, the convolutional neural network may be used to perform convolution operation on the image to extract various features (such as texture feature, or color feature) of the image to obtain the initial feature map.

Alternatively, the convolutional neural network may be implemented based on a feature pyramid network FPN and a residual network ResNet, where a step size of at least one convolutional layer preceding to the output layer of the residual network may be set to 1, and a feature map output by the residual network is subject to deformable convolution to generate an input feature map of the feature pyramid network.

Taking ResNet50 as an example, ResNet50 generally processes an input image through 5 stages to obtain output feature maps. Assuming that the output feature maps of the input image after the 5 stages of the processing in sequence are S1-S5, then the convolution step size in stage 4 and stage 5 may be set to 1, so that S4 and S5 may keep more underlying image information such as text texture or text boundary.

Then, deformable convolution processing may be performed on the feature map S5, and then the processed feature map may be input to the FPN, and the final feature map output by the FPN may be used as the initial feature map. The use of deformable convolution may make the convolutional neural network better adapt to an irregular boundary of the to-be-processed text, thus improving the accuracy of subsequent text recognition.

Step 302, performing text instance segmentation on the initial feature map, to obtain the instance feature maps.

In the present embodiment, various existing instance segmentation methods may be used to perform text instance segmentation on the initial feature map to obtain the instance feature maps.

Alternatively, features of different receptive fields of the initial feature map may be first extracted respectively using a network of PPM (Pyramid Pooling Module) structure, and then the features of different receptive fields may be concatenated and dimensionally converted. For example, feature extractions may be performed on the initial feature map respectively using 1*1, 3*3, and 5*5 convolutional layers in parallel, then the features extracted by the convolutional layers may be concatenated, and dimension conversion may be performed using the 1*1 convolutional layer for subsequent processing.

Alternatively, after performing operations such as concatenation and dimension conversion on the features of different receptive fields, further feature conversion may also be performed, based on a spatial attention mechanism, using a plurality of stacked convolutional layers, to obtain features with enhanced spatial location. For example, for the above extracted features of different receptive fields, after concatenation and dimension conversion, a spatial attention feature map may be further acquired using the 3*3 and 1*1 convolutional layers. Then, text instance segmentation may be performed based on the obtained spatial location-enhanced features.

Step 303, performing text sequence segmentation on the initial feature map, to obtain sequential feature maps.

In the present embodiment, in order to maintain a reading sequence of the words in the to-be-recognized text in the image, the initial feature map may be processed using various existing text sequence segmentation methods to obtain the sequential feature maps.

For example, the initial feature map may be input to a network constructed based on the structure of a convolutional encoder-decoder to perform simple convolutional downsampling and inverse convolutional upsampling on the initial feature map, to obtain the sequential feature maps.

Step 304, fusing the instance feature maps and the sequential feature maps to obtain the feature maps obtained by means of performing text instance segmentation on the image of the to-be-recognized text.

In the present embodiment, the obtained instance feature maps and the sequential feature maps may be fused to obtain the feature maps obtained by means of performing text instance segmentation on the image of the to-be-recognized text.

In the case where there are at least two text instances in the instance feature maps, the instance feature maps may be fused with the sequential feature map corresponding to each text instance, respectively, to obtain at least two fused feature maps.

In particular, various feature fusion methods may be used to fuse an instance feature map and a sequential feature map. For example, fusion of the instance feature map and the sequential feature map may be realized by multiplying corresponding pixels in the instance feature map and the sequential feature map.

In some alternative implementations of the present embodiment, the spatial semantic feature of a node in the relationship graph constructed based on the feature map(s) may further include a sequential feature of a feature map in which the pixel represented by the node is located.

In this regard, for a node in the relationship subgraph corresponding to each feature map, a spatial semantic feature of the node may be generated through the following operations:

Step I, acquiring a sequence value of a feature map corresponding to the node in the feature maps.

In this step, since the feature maps are obtained based on performing text instance segmentation on the image of the to-be-recognized text, the feature maps have a sequential relationship with each other, i.e., corresponding to a sequence between the segmented instances.

The sequence value may indicate a sorting position of the feature map in the feature maps. For example, if 20 feature maps are preset, a sorting number (one of numbers 1-20) of each feature map may be used as the sequence value of the feature map.

It may be understood that pixels in the same feature map correspond to the same sequence value.

Step II, determining, based on the sequence value of the feature map corresponding to the node, the sequential feature of the feature map corresponding to the node.

In this step, the sequential feature of the feature map may be represented using a vector. Therefore, the sequential features corresponding to respective feature maps may be obtained by mapping the sequence values to the same vector space. In particular, the method for mapping may adopt various existing mapping methods.

For example, vector representation of the sequence value may use sine and cosine functions of different wavelengths. As an example, the vector representation of each sequence value may be obtained using the following formula:

$$\varepsilon_{2i}(z) = \cos\left(\frac{z}{1000^{\frac{2i}{C_\varepsilon}}}\right), i \in \left(0, \frac{C_\varepsilon}{2} - 1\right)$$

$$\varepsilon_{2i+1}(z) = \sin\left(\frac{z}{1000^{\frac{2i}{C_\varepsilon}}}\right), i \in \left(0, \frac{C_\varepsilon}{2} - 1\right)$$

where, z may represent the sequence value. $C\varepsilon$ represents a vector dimension, which may be pre-set by those skilled in the art. i represents the serial number of an element in the vector. $\varepsilon_{2i}$ represents elements having even serial numbers in the vector, and $\varepsilon_{2i+1}$ represents elements having odd serial numbers in the vector.

Step III, splicing the position feature, the type feature and the sequential feature of the pixel represented by the node to obtain the spatial semantic feature of the node.

In this step, the position feature, the type feature and the sequential feature of the pixel represented by the node may be sequentially spliced to obtain the spatial semantic feature of the node. Both the position feature and the type feature of the pixel may be represented using vectors.

Alternatively, for each node, the position feature and the type feature of the pixel may be first represented by vector representation, and then the vector representation of the position feature and the type feature of the node may be spliced with the vector representation of the sequential feature of the node, to obtain the spatial semantic feature of the node.

As an example, for any node, the abscissa of the node is X, the ordinate is Y, and the type feature is P, then X, Y, and P are mapped as vector representations, respectively, and then the vector representations corresponding to X, Y, and P are concatenated as the vector representation corresponding to the position feature and the type feature of the node. The method for mapping X, Y, and P as vector representation may adopt various existing mapping methods.

It should be noted that for ease of calculation, dimensions of the vector representations may be kept consistent to each other. For example, the dimensions of the vector representations may be flexibly adjusted using the 1*1 convolution.

Alternatively, before splicing the vector representation corresponding to the position feature and the type feature of the node and the vector representation of the sequential feature of the node, the vector representation corresponding to the position feature and the type feature of the node may be normalized first using various normalization methods so as to facilitate reduction of vector elements, thereby facilitating subsequent calculations.

As an example, normalization may be realized by subtracting, from the vector representation of the node, the vector representation corresponding to the position feature and the type feature of a target node in the corresponding feature map. It may be appreciated that the vector representation corresponding to the position feature and the type feature of the target node is 0 after the normalization processing.

The target node may be predefined by those skilled in the art, or flexibly set during the calculation. For example, the target node may be the root node of the feature map. Typically, the geometric center point of the feature map may be set as the root node.

Alternatively, the root node of the feature map may be determined through the following operations: determining, for a node in the feature map, an intersection and concatenation ratio between the node and each of the other nodes, respectively, and in response to determining that the respective intersection and concatenation ratios corresponding to the node are not greater than a preset threshold, determining the node as the root node. The intersection and concatenation ratio may represent a ratio of the number of elements included in an intersection of neighboring nodes of two nodes to the number of elements included in a concatenation of the neighboring nodes. The preset threshold may be pre-set by those skilled in the art. By using this method, a pixel at the center of each word may be efficiently selected as the root node, at the same time, distribution of nodes in the relationship subgraph corresponding to the feature map may also be balanced.

In some alternative implementations of the present embodiment, for two nodes, the similarity of spatial semantic features of the two nodes may be determined through the following operations:

Step I, determining an Euclidean distance between the two nodes, and determining a first similarity based on the Euclidean distance.

In this step, the Euclidean distance between two nodes is generally inversely proportional to the similarity of spatial semantic features of the two nodes, and the first similarity may be determined on basis of this, using various methods. As an example, the first similarity may be determined using the following formula:

$$E_s(p, q) = 1 - \frac{D(p, q)}{\max(H_m, W_m)}$$

where, p and q denote two nodes respectively. $D(p,q)$ denotes the Euclidean distance between p and q. $H_m$ and $W_m$ denote a height and a width of the feature map respectively. $E_s(p,q)$ denotes the first similarity.

Step II, determining a cosine similarity of the type features corresponding to the two nodes.

In this step, the cosine similarity may be calculated, by an existing cosine similarity calculation method, using the vector representations of the type features corresponding to the two nodes.

Step III, determining the similarity of spatial semantic features of the two nodes, based on the first similarity and the cosine similarity.

In this step, the spatial semantic feature similarity may be generally proportional to the first similarity and also proportional to the cosine similarity. Based on this, various methods may be used to determine the similarity of spatial semantic features of the two nodes. For example, a product of the first similarity and the cosine similarity may be directly calculated and used as the similarity of spatial semantic features of the two nodes. Thus, the similarity between the nodes in various aspects such as spatial location and type may be considered comprehensively, thereby helping to construct a more accurate relationship graph.

In some alternative implementations of the present embodiment, in constructing the relationship graph corresponding to the feature map, for each node, the similarities between spatial semantic feature of the node and spatial semantic features of the other nodes may be calculated respectively, then in accordance with the similarities in descending order, a target number of nodes may be selected as the neighboring nodes of the node, i.e., to establish edges between the selected nodes and the node. The target number may be set flexibly according to the application scenario. For example, the target number may be 8. Thus, the complexity and accuracy of the constructed relationship graph may be more flexibly controlled to assist in subsequent calculations.

In some alternative implementations of the present embodiment, the above graph convolutional network may include a first graph convolutional network and an output network. The first graph convolutional network may be used for transforming a feature matrix of the constructed relationship graph. The output network may be used for selecting nodes from the respective relationship subgraphs based on an output of the first graph convolutional network, as well as aggregating transformed features corresponding to the nodes selected from the respective relationship subgraphs to obtain the first text feature.

For each relationship subgraph, the feature matrix of the relationship graph and an adjacency matrix may be used to represent the relationship subgraph. Elements in the feature matrix are used to represent features of the nodes in the relationship subgraphs. The adjacency matrix is used to represent connectivity between the nodes in the relationship subgraphs (such as whether there is edge between the nodes).

The first graph convolutional network may adopt various existing convolutional network structures in order to realize the transformation of the feature matrix of the relationship graph.

Alternatively, the first graph convolutional network may include a first graph convolutional subnetwork and a second graph convolutional subnetwork. The first graph convolutional subnetwork may be used for transforming the feature matrix of the relationship graph. The second graph convolutional subnetwork may be used for transforming, according to a relationship graph constructed based on an output of the first graph convolutional subnetwork, a feature matrix output by the first graph convolutional subnetwork.

In this case, after the first graph convolutional subnetwork transforms the feature matrix of the relationship graph, it may recalculate the similarity between the nodes and re-establish edges, i.e., update the relationship subgraph, in accordance with the features of nodes in the transformed feature matrix. The second graph convolutional subnetwork may process the updated relationship subgraph.

The structures of the first graph convolutional subnetwork and the second graph convolutional subnetwork may be flexibly set by those skilled in the art according to actual application requirements.

As an example, the processing of the first graph convolutional subnetwork is shown in the following equation:

$$Y^l = \sigma\left(\left(X^l \oplus \left(\tilde{D}^{\frac{-1}{2}}\tilde{A}\tilde{D}^{\frac{-1}{2}}\right)X^l\right)W^l\right)$$

$$\tilde{A} = A + I_N$$

$$\tilde{D}_{ii} = \sum_j \tilde{A}_{ij}$$

where, l is the number of convolutional layers of the first graph convolutional subnetwork. $Y^l$ denotes an output of the lth layer. $X^l$ denotes an input to the lth layer. $W^l$ is a network parameter learned by the first graph convolutional subnetwork. A denotes the adjacency matrix of the relationship graph. $I_N$ represents a matrix of the same size as A and main diagonal elements are all 1. $\tilde{D}$ is a diagonal array. i and j denote serial numbers of rows and columns, respectively. $\sigma$ denotes a nonlinear activation function. $\oplus$ denotes connecting matrices by dimension.

The processing of the second graph convolutional subnetwork is shown in the following equation:

$$Y_c^l = \sigma\left(\left(\tilde{D}^{\frac{-1}{2}}\tilde{A}_c\tilde{D}^{\frac{-1}{2}}\right)W_c^l\right)$$

where, l is the number of convolutional layers of the second graph convolutional subnetwork.

$$Y_c^l$$

denotes an output of the lth layer.

$$W_c^l$$

denotes a network parameter learned by the second graph convolutional subnetwork. It should be noted that $\tilde{A}_c$ and $\tilde{D}$ are matrices obtained based on the updated relationship graph, which are calculated in the same way as the $\tilde{A}$ and $\tilde{D}$ in the first graph convolutional subnetwork described above.

In particular, the output network may recalculate the distance between nodes based on the update to the feature information of the nodes in the relationship graph represented by the output of the first graph convolutional network, and then discard some of the nodes (e.g., half of the nodes) in accordance with the distances in ascending order, thereby realizing a pooling operation and reducing the size of the corresponding feature map.

Alternatively, the process of updating features and selecting nodes by the first graph convolutional network and the output network may be performed iteratively until there is only one node left in each relationship subgraph. The feature information of the selected node in each relationship subgraph may then be spliced sequentially following the sequence between the relationship subgraphs, to form the first text feature.

Through iteration of the process of feature updating and node selecting by the first graph convolutional network and the output network, the node whose spatial relationship that best represents the corresponding text instance may be selected from a relationship subgraph, so that the feature information of the node can be used for subsequent text recognition, which helps to improve an efficiency and accuracy of text recognition.

The method provided by the above embodiment of the present disclosure proposes a graph-based text recognition method. In particular, the relationship graph is constructed according to the feature map(s) obtained by performing text instance segmentation, to express spatial semantic information of the text using a graph structure, then graph convolution processing is performed on the relationship graph to extract two-dimensional spatial feature information of the to-be-recognized text in the image, and to realize recognition of the to-be-recognized text in the image in combination with the sequential relationship between the text instances.

Figure 4:
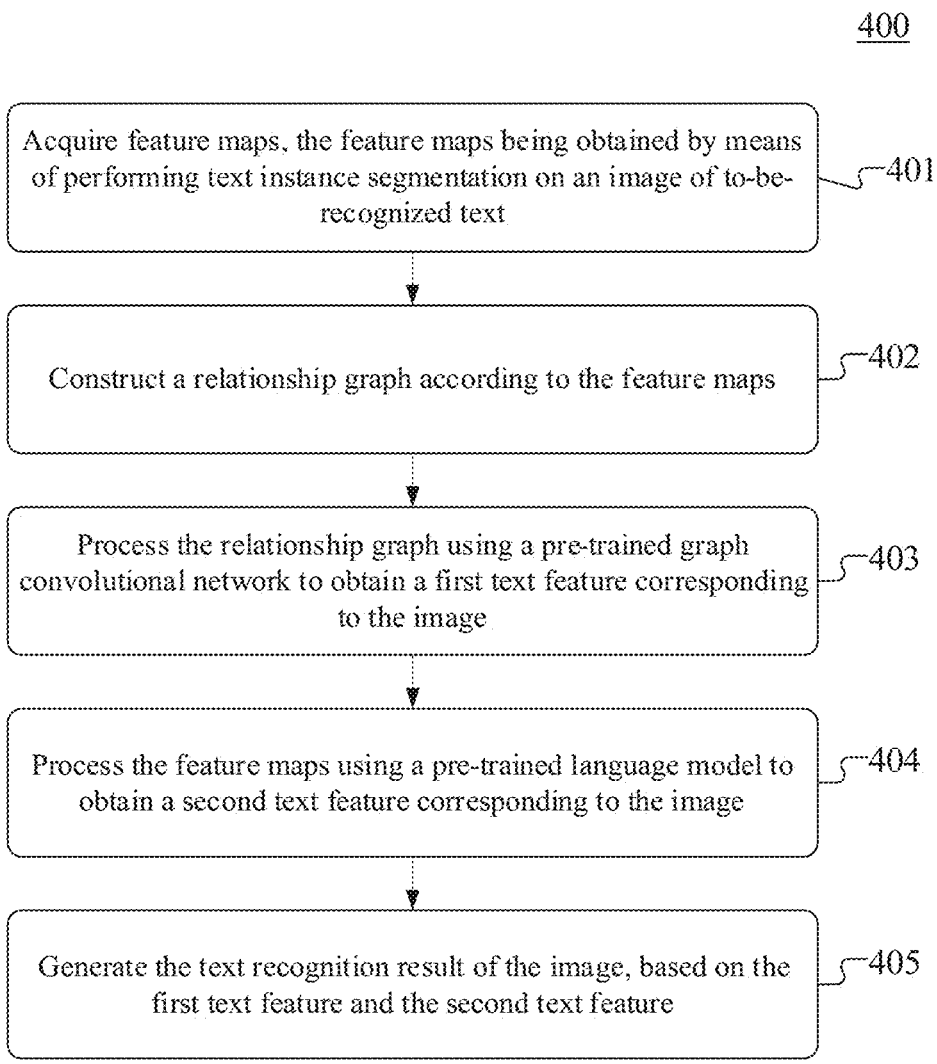
FIG. 4 is a flowchart of a method for recognizing a text according to another embodiment of the present disclosure.

With further reference to FIG. 4, illustrating a flow 400 of the method for recognizing a text according to another embodiment of the present disclosure. The method for recognizing a text includes the following steps:

Step 401, acquiring feature map(s), the feature map(s) being obtained by means of performing text instance segmentation on an image of a to-be-recognized text.

Step 402, constructing a relationship graph according to the feature map(s).

Step 403, processing the relationship graph using a pre-trained graph convolutional network, to obtain a first text feature corresponding to the image.

Step 404, processing the feature map(s) using a pre-trained language model to obtain a second text feature corresponding to the image.

In the present embodiment, the language model may be various existing language models for text recognition, such as N-Gram model, HMM (Hidden Markov Model), or BERT (Bidirectional Encoder Representations from Transformers). Generally, a feature representation of a text sequence generated by the language model preceding to the output layer may be used as the second text feature.

Alternatively, the feature map(s) may first be processed using a pre-trained semantic feature extraction network to obtain a semantic feature corresponding to the feature map(s). The semantic feature is then input to the language model to obtain the second text feature. The semantic feature extraction network may adopt the structure of various existing feature extraction networks.

As an example, the semantic feature extraction network may include a pooling layer that performs pooling processing on the feature map(s) and a linear layer that performs linear transformation on an output of the pooling layer. In particular, a pooling operation is first performed on the input feature map(s), then linear transformation is performed on result of the pooling operation, to reduce a resolution of the image space and generate the semantic features.

The language model may adopt the structure of various existing models based on natural language processing. For example, a translation model or the like predicts semantics of each word instance using a number of word instances prior to and following the word instance to realize text recognition.

Step 405, generating the text recognition result of the image, based on the first text feature and the second text feature.

In the present embodiment, various methods may be used to generate the text recognition result of the image by combining the first text feature and the second text feature. For example, various existing feature fusion methods may be used to fuse the first text feature and the second text feature to obtain a fused text feature, and then recognition is performed on the fused text feature to obtain the recognition result.

Since the text recognition process for the language model uses one-dimensional compressed feature information, two-dimensional spatial feature information is ignored. More reliable text recognition may be realized by combining the graph-based text recognition method and the language model-based text recognition method in order to use richer feature information.

In some alternative implementations of the present embodiment, based on the first text feature, the second text feature and the feature map, the text recognition result of the image is generated.

Since the feature map itself may represent the image feature of the to-be-recognized text, representation of the text feature may be further enhanced by combining the feature map(s) obtained by means of performing text instance segmentation while using the first text feature and the second text feature for text recognition, thereby improving the text recognition effect.

The recognition method may be set flexibly according to actual application requirements. For example, the first text feature, the second text feature, and the feature map(s) may first be fused using various existing feature fusion methods, and then the fused feature may be used to predict the text recognition result.

Alternatively, the first text feature, the second text feature, and the feature map(s) may be input to a pre-trained feature fusion network to generate the text recognition result of the image.

Here, the feature fusion network may be used for splicing the first text feature, the second text feature and the feature map(s), then performing linear transformation on an obtained splicing result to obtain the text recognition result of the image. The structure of the feature fusion network may be pre-set by those skilled in the art.

As an example, the processing of the feature fusion network is shown in the following equation:

$$f_t = W_t \odot (W_f \cdot [v_t; l_t; g_t])$$

$$W_t = Sigmod(W_z \cdot [v_t; l_t; g_t])$$

where, $f_t$ denotes a fusion result from the feature fusion network. $v_t$, $l_t$, and $g_t$ denotes the feature map, the second text feature and the first text feature, respectively. $W_z$ and $W_f$ denote linear transformation parameters to be learned by the feature fusion network. $\odot$ represents a multiplication operation between elements. ";" represents a splicing operation by dimension. Sigmod is an activation function. t denotes the number of feature maps obtained by means of performing text instance segmentation on the image of the to-be-recognized text.

It should be noted that the feature maps have a sequential relationship, and the first text feature and the second text feature are also feature representations of text sequences generated based on this sequential relationship, thus, each fusion is a fusion of the corresponding text features in the feature map, the second text feature, and the first text feature, so as to obtain the final fusion result.

In addition, it should also be noted that since the corresponding text instances have a contextual sequential relationship with each other, the feature maps also have a contextual sequential relationship with each other. However, in processing the feature maps, embodiments of the present disclosure may recognize the text instance corresponding to each feature map respectively in parallel, in order to improve a processing efficiency.

Unspecified contents in the present embodiment may be referred to relevant description in the corresponding embodiment of FIG. 2, detailed description thereof will be omitted.

Figure 5A:
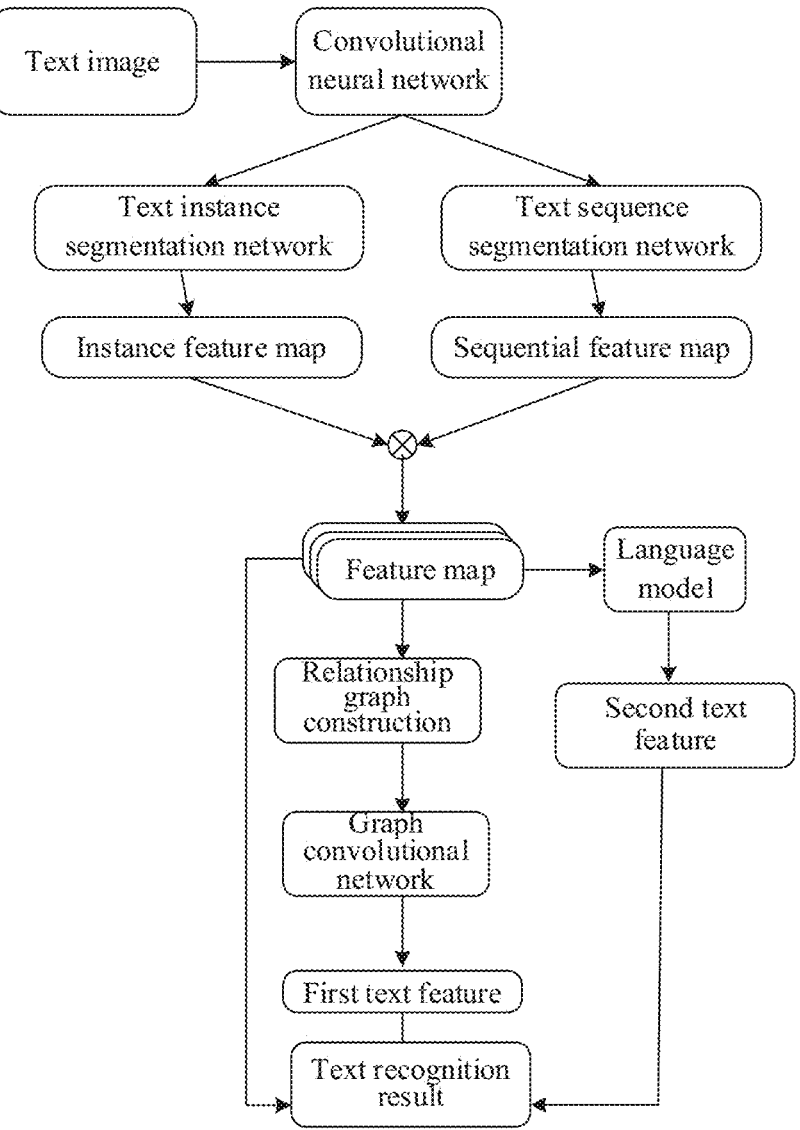
FIGS. 5a, 5b, 5c are schematic diagrams of example application scenarios of the method for recognizing a text according to embodiments of the present disclosure.
Figure 5B:
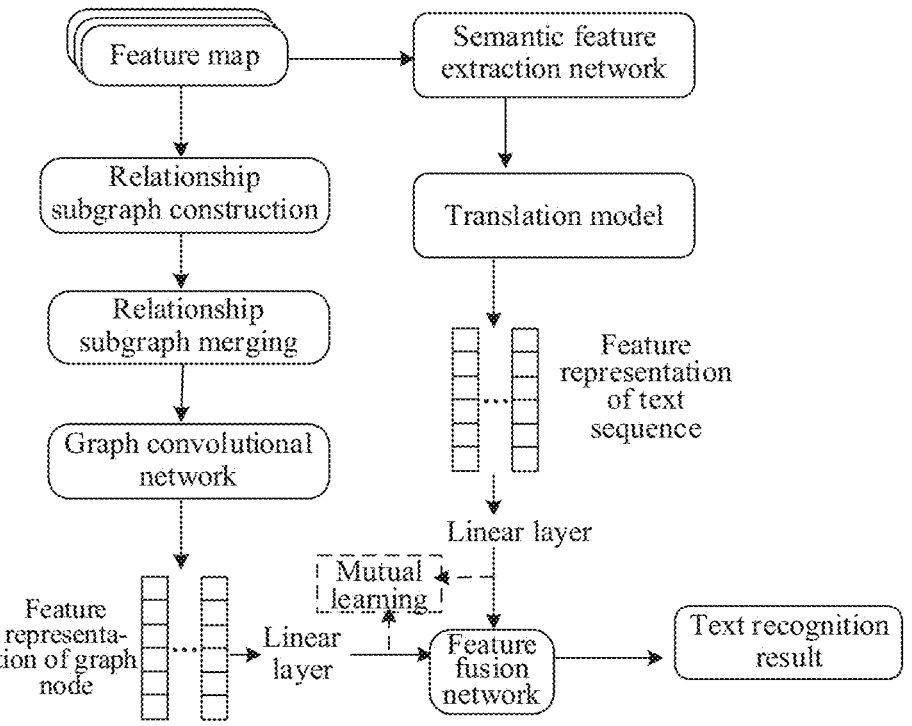
Figure 5C:
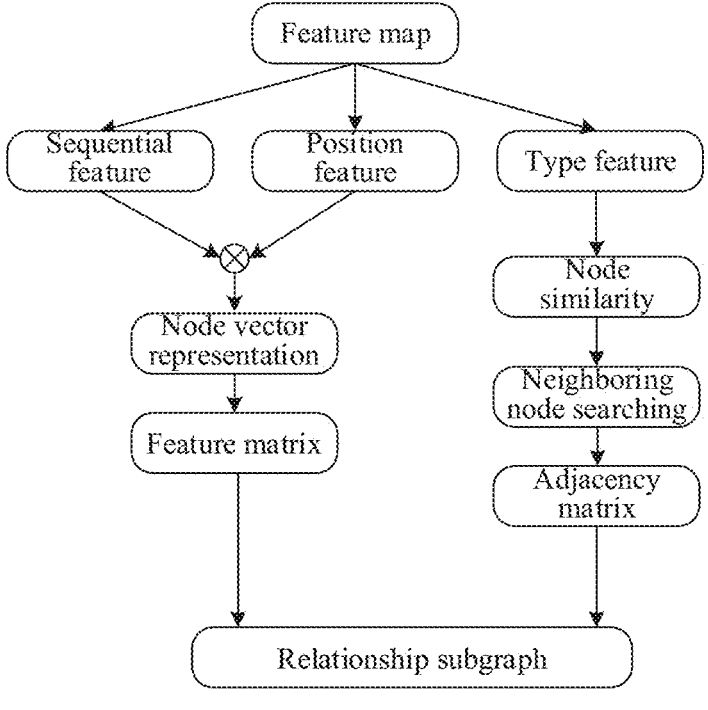

With further reference to FIG. 5*a*, FIG. 5*b*, and FIG. 5*c*, which are schematic diagrams of application scenario(s) of the method for recognizing a text according to the present embodiment. In particular, as shown in FIG. 5*a*, an image of a to-be-recognized text, i.e., a text image, may be acquired first, then the text image is input to a pre-trained convolutional network for extracting an initial feature map, and then, the initial feature map is input to a text instance segmentation network and a text sequence segmentation network, respectively, to extract instance feature maps and sequential feature maps, and then the obtained instance feature maps and the sequential feature maps are fused to form a plurality of feature maps corresponding to the text image.

Then, a relationship graph may be constructed based on the obtained plurality of feature maps, and then the constructed relationship graph may be processed using a pre-trained graph convolutional network to obtain a first text feature of the text image. At the same time, a language model is used to process the obtained plurality of feature maps to obtain a second text feature of the text image. Then, the obtained plurality of feature maps, the first text feature and the second text feature are combined for text recognition, to obtain a text recognition result corresponding to the text image.

Here, the process of processing the obtained plurality of feature maps using the graph convolutional network and the language model may be referred to in FIG. 5*b*. In particular, a relationship subgraph corresponding to each feature map may be constructed first, then the relationship subgraphs may be merged to obtain the relationship graph, and the relationship graph obtained from the merging may be processed using the graph convolutional network to obtain feature representation of nodes in the relationship graph. At the same time, the feature maps may be first input to the semantic feature extraction network to extract semantic features, and then a translation model may be used to form feature representation of a text sequence corresponding to the to-be-recognized text based on the semantic features.

Then, in order to fuse the feature representation of the nodes in the obtained relationship graph and the feature representation of the text sequence, processing such as dimensional transformation may be performed on the feature representations using a linear layer, to fuse the feature representation of the nodes in the relationship graph and the feature representation of the text sequence, and the text recognition result of the text image may be generated based on a fusion result.

Here, the process of constructing the corresponding relationship subgraph for each feature map may be referred to in FIG. 5c. In particular, a sequential feature of the feature map, as well as a position feature and a type feature of each pixel therein, may be determined first. Then, the sequential feature and the position feature may be fused, and a vector representation of each node may be formed by a method such as mapping, thereby obtaining a feature matrix of the relationship subgraphs, the feature matrix is composed of the vector representations of respective nodes. At the same time, similarities between nodes represented by pixels may be determined based on the type feature, and neighboring nodes may be searched for each node based on the similarities between the nodes to construct an edge, thereby forming an adjacency matrix of the relationship subgraphs. Then, the relationship subgraph corresponding to the feature map may be represented by the obtained feature matrix and the adjacency matrix.

The method provided by the above embodiment of the present disclosure dynamically fuses the graph-based text recognition method and the language model-based text recognition method, so that the two recognition methods may learn from each other, in order to use more information for text recognition, thereby enhancing a text recognition effect to better adapt to diverse text recognition situations such as complex backgrounds of pictures, uneven illumination, blurred pictures, and varied text morphology, in text recognition of natural scenarios. The method described in the above embodiments of the present disclosure may be applied to text recognition in practical business scenarios such as assisting navigation with visual impairments, autonomous driving, text reading and translation in augmented reality, or the like. The method described in the embodiments of the present disclosure may also be applied to other practical business scenarios, which are not enumerated in the present specification.

Figure 6:
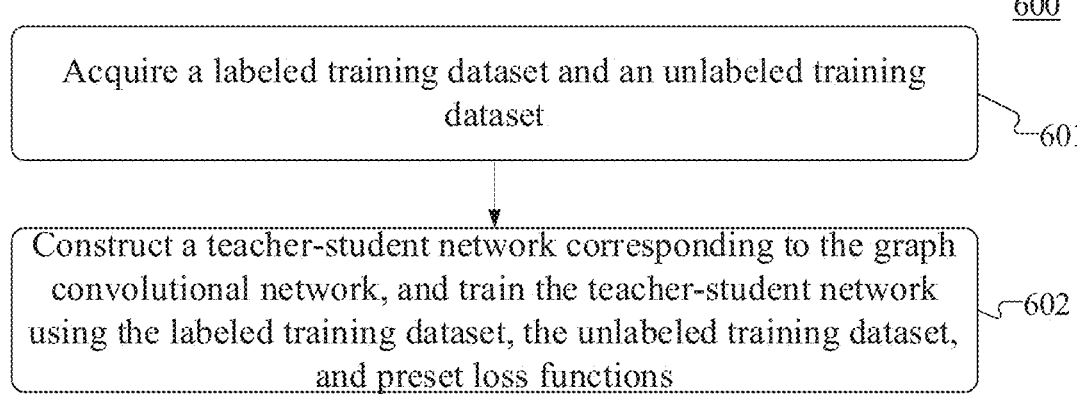
FIG. 6 is a flowchart of a method for training a graph convolutional network, a language model, and a segmentation network in the method for recognizing a text according to an embodiment of the present disclosure.

With further reference to FIG. 6, illustrating a flow 600 of a method for training a graph convolutional network, a language model, and a segmentation network in the method for recognizing a text according to an embodiment of the present disclosure. As shown in FIG. 6, the graph convolutional network, the language model, and the segmentation network may be obtained by training through the following operations:

Step 601, acquiring a labeled training dataset and an unlabeled training dataset.

In the present embodiment, it should be noted that the training of the graph convolutional network, the language model, and the segmentation network may be performed by the executing body of the method for recognizing a text, or may be performed by other electronic devices. The executing body for training the graph convolutional network, the language model and the segmentation network may acquire the labeled training dataset and the unlabeled training dataset from local or other storage devices.

The labeled training dataset is composed of training data having labels, and the unlabeled training dataset is composed of unlabeled training data. The labeled training dataset may include labels of different granularities. For example, for character-based text recognition, the labels may include a character-level label and a word-level label.

Step 602, constructing a teacher-student network corresponding to the graph convolutional network, the language model, and the segmentation network, and training the teacher-student network using the labeled training dataset, the unlabeled training dataset, and a preset loss function.

In the present embodiment, the teacher-student network is a network structure in transfer learning. The structure of the teacher network may be identical or different from the structure of the student network. When the structures of the teacher network and the student network are identical, parameter sharing for the structures of the teacher network and the student network may be realized based on EMA (Exponential Moving Average, etc.) technology.

In the present embodiment, an input to the student network may include labeled training data and unlabeled training data, and an input to the teacher network may include only the unlabeled training data. The loss function may include a first loss function, a second loss function, and a third loss function.

The first loss function and the second loss function may represent differences between output results of the student network for the labeled training data and the labels of different granularities, respectively. For example, the first loss function may be used to measure the difference between a character-level recognition result output by the student network and the true character-level label, and the second loss function may be used to measure the difference between a word-level recognition result output by the student network and the true word-level label.

The third loss function may represent differences between output results of the student network and the teacher network for the unlabeled training data, respectively. In particular, the first loss function, the second loss function, and the third loss function may be combined (such as optimizing a sum of the three loss functions) to adjust parameters of the graph convolutional network, the language model, and the segmentation network in order to accomplish the training of the graph convolutional network, the language model, and the segmentation network.

Also, it should be noted that the training of the various networks or models in the present disclosure may be accomplished based on various existing training methods of machine learning, detailed description thereof will be omitted.

The method for training a graph convolutional network, a language model, and a segmentation network provided by the above embodiment of the present disclosure uses labeled training data and unlabeled training data to jointly train the graph convolutional network, the language model, and the segmentation network, which solves problems such as less real training data and difficult labelling for real data in practice, and may also improve the generalizability and robustness of an overall network composed of the graph convolutional network, the language model, and the segmentation network, thereby helping to improve the accuracy of text recognition results.

Figure 7:
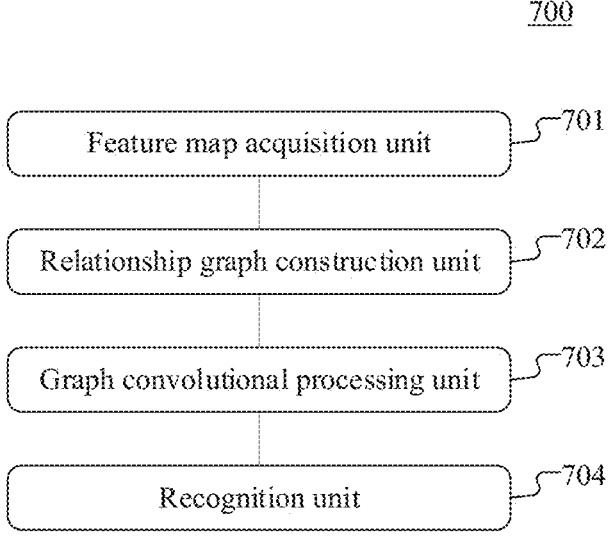
FIG. 7 is a schematic structural diagram of an apparatus for recognizing a text according to an embodiment of the present disclosure.

With further reference to FIG. 7, as an implementation of the method shown in the above figures, an embodiment of the present disclosure provides an apparatus for recognizing a text, the embodiment of the apparatus corresponds to the embodiment of the method shown in FIG. 2, and the apparatus may be applied in various electronic devices.

As shown in FIG. 7, the apparatus 700 for recognizing a text provided in the present embodiment includes: a feature map acquisition unit 701, a relationship graph construction unit 702, a graph convolutional processing unit 703 and a recognition unit 704. The feature map acquisition unit 701 is configured to acquire feature maps, the feature maps being obtained by means of performing text instance segmentation on an image of a to-be-recognized text. The relationship graph construction unit 702 is configured to construct a relationship graph according to the feature maps, where in the relationship graph: each node represents a pixel in a feature map, each edge represents that a similarity of spatial semantic features of two nodes connected by the edge is greater than a target threshold, and a spatial semantic feature of a node comprises a position feature and a type feature of a pixel represented by the node. The graph convolutional processing unit 703 is configured to process the relationship graph using a pre-trained graph convolutional network, to obtain a first text feature corresponding to the image. The recognition unit 704 is configured to generate a text recognition result of the image based on the first text feature.

In the present embodiment, in the apparatus 700 for recognizing a text, for the specific processing and the technical effects of the feature map acquisition unit 701, the relationship graph construction unit 702, the graph convolutional processing unit 703 and the recognition unit 704, reference may be made to the relevant descriptions of step 201, step 202, step 203 and step 204 in the corresponding embodiment of FIG. 2 respectively, detailed description thereof will be omitted.

In some alternative implementations of the present embodiment, the apparatus 700 for recognizing a text further includes: a language model processing unit (not shown in the figure), configured to process the feature maps using a pre-trained language model to obtain a second text feature corresponding to the image; and the recognition unit 704 is further configured to generate the text recognition result of the image, based on the first text feature and the second text feature.

In some alternative implementations of the present embodiment, the recognition unit 704 is further configured to: generate the text recognition result of the image, based on the first text feature, the second text feature and the feature maps.

In some alternative implementations of the present embodiment, the feature map is at least two feature maps; and the relationship graph construction unit 702 is further configured to: construct, for each feature map in the at least two feature maps, a relationship subgraph corresponding to the feature map; and merge the relationship subgraphs corresponding to the feature maps to obtain the relationship graph.

In some alternative implementations of the present embodiment, the feature map in the at least two feature maps is used to represent an image feature of an image area in which a word of the to-be-recognized text is located and a sequential feature between the feature map and other feature maps.

In some alternative implementations of the present embodiment, each feature map is generated through following steps: inputting the image to a convolutional neural network trained in advance to obtain an initial feature map; performing text instance segmentation on the initial feature map to obtain instance feature maps; performing text sequence segmentation on the initial feature map to obtain sequential feature maps; and fusing the instance feature maps and the sequential feature maps to obtain the feature maps obtained by means of performing text instance segmentation on the image of the to-be-recognized text.

In some alternative implementations of the present embodiment, the convolutional neural network is implemented based on a feature pyramid network and a residual network, wherein a step size of at least one convolutional layer preceding to an output layer of the residual network is 1, and a feature map output by the residual network is subject to deformable convolution to generate an input feature map of the feature pyramid network.

In some alternative implementations of the present embodiment, the language model processing unit is further configured to: process the feature maps using a semantic feature extraction network trained in advance to obtain a semantic feature corresponding to the feature maps, where the semantic feature extraction network comprises a pooling layer that performs pooling processing on the feature maps and a linear layer that performs linear transformation on an output of the pooling layer; and input the semantic feature to the language model to obtain the second text feature.

In some alternative implementations of the present embodiment, the spatial semantic feature of the node further comprises a sequential feature of a feature map in which the pixel represented by the node is located; and for a node in a relationship subgraph, a spatial semantic feature of the node is generated through following operations: acquiring a sequence value of a feature map corresponding to the node in the at least two feature maps; determining, based on the sequence value, the sequential feature of the feature map corresponding to the node; and splicing the position feature, the type feature, and the sequential feature of the pixel represented by the node to obtain the spatial semantic feature of the node.

In some alternative implementations of the present embodiment, the similarity of spatial semantic features of two nodes is determined through following steps: determining an Euclidean distance between the two nodes, and determining a first similarity based on the Euclidean distance; determining a cosine similarity of the type features corresponding to the two nodes; and determining the similarity of spatial semantic features of the two nodes, based on the first similarity and the cosine similarity.

In some alternative implementations of the present embodiment, the relationship graph construction unit 702 is further configured to: connect root nodes of neighboring relationship subgraphs in sequence according to a sequential relationship between the relationship subgraphs.

In some alternative implementations of the present embodiment, a root node of a feature map is determined through following operations: determining, for a node in the feature map, an intersection and concatenation ratio between the node and each of other nodes, respectively, wherein the intersection and concatenation ratio represents a ratio of a number of elements included in an intersection of neighboring nodes of two nodes to a number of elements included in a concatenation of the neighboring nodes of the two nodes; and in response to determining that respective intersection and concatenation ratios corresponding to the node are not greater than a preset threshold, determining the node as the root node.

In some alternative implementations of the present embodiment, the graph convolutional network comprises a first graph convolutional network and an output network, wherein the first graph convolutional network is used for transforming a feature matrix of the relationship graph, and the output network is used for selecting nodes from the respective relationship subgraphs based on an output of the first graph convolutional network, and aggregating transformed features corresponding to the nodes selected from the respective relationship subgraphs to obtain the first text feature.

In some alternative implementations of the present embodiment, the first graph convolutional network comprises a first graph convolutional subnetwork and a second graph convolutional subnetwork, wherein the first graph convolutional subnetwork is used for transforming the feature matrix of the relationship graph, and the second graph convolutional subnetwork is used for transforming, according to a relationship graph constructed based on an output of the first graph convolutional subnetwork, a feature matrix output by the first graph convolutional subnetwork.

In some alternative implementations of the present embodiment, the recognition unit 704 is further configured to: the first text feature, the second text feature, and the feature maps to a pre-trained feature fusion network to generate the text recognition result of the image, wherein the feature fusion network is used for splicing the first text feature, the second text feature, and the feature maps, and perform linear transformation on a result obtained by the splicing to obtain the text recognition result of the image.

In some alternative implementations of the present embodiment, performing text instance segmentation on the initial feature map to obtain instance feature maps, comprises: performing text instance segmentation on the initial feature map using a pre-trained text instance segmentation network to obtain the instance feature maps; and the performing text sequence segmentation on the initial feature map to obtain sequential feature maps, comprises: performing text sequence segmentation on the initial feature map using a pre-trained text sequence segmentation network to obtain the sequential feature maps; and the graph convolutional network, the language model, and the segmentation network are obtained by training through following operations, wherein the segmentation network comprises the convolutional neural network, the text instance segmentation network and the text sequence segmentation network: acquiring a labeled training dataset and an unlabeled training dataset, wherein training data in the labeled training dataset comprises labels of different granularity; and constructing a teacher-student network corresponding to the graph convolutional network, the language model, and the segmentation network, and training the teacher-student network using the labeled training dataset, the unlabeled training dataset, and a preset loss function, wherein an input to the student network comprises labeled training data and unlabeled training data, and an input to the teacher network comprises the unlabeled training data, the loss function comprises a first loss function, a second loss function, and a third loss function, the first loss function and the second loss function respectively represent differences between output results of the student network for the labeled training data and the labels of different granularities, and the third loss function represents differences between output results of the student network and output results of the teacher network for the unlabeled training data, respectively.

In the apparatus provided by the above embodiment of the present disclosure, the feature map acquisition unit acquires feature maps, the feature maps being obtained by means of performing text instance segmentation on an image of a to-be-recognized text; the relationship graph construction unit constructs a relationship graph according to the feature maps, where in the relationship graph: each node represents a pixel in a feature map, each edge represents that a similarity of spatial semantic features of two nodes connected by the edge is greater than a target threshold, and a spatial semantic features of a node includes a position feature and a type feature of a pixel represented by the node; the graph convolutional processing unit processes the relationship graph using a pre-trained graph convolutional network to obtain a first text feature corresponding to the image; and the recognition unit generates a text recognition result of the image based on the first text feature. In this regard, graph-based text recognition is realized, which takes into account two-dimensional spatial information of the text in the image and helps to improve the text recognition effect.

Figure 8:
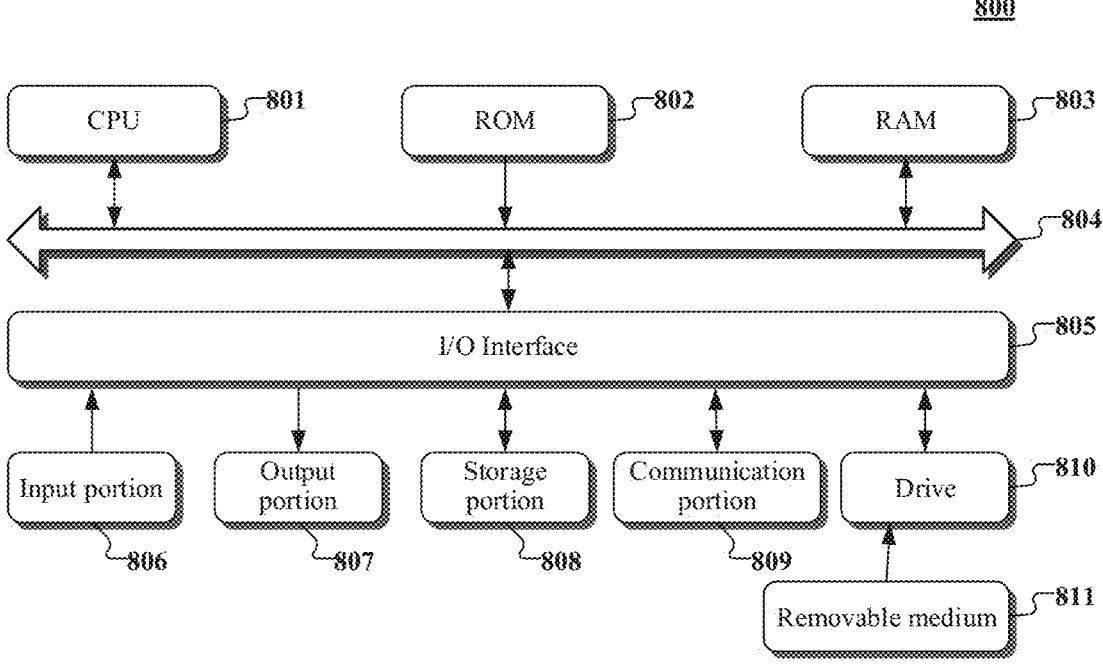
FIG. 8 is a schematic structural diagram of an electronic device suitable for implementing embodiments of the present disclosure.

With further reference to FIG. 8, illustrating a schematic structural diagram of an electronic device (e.g., the server in FIG. 1) 800 suitable for implementing embodiments of the present disclosure. The terminal device in the embodiments of the present disclosure may include, but is not limited to, a mobile terminal such as mobile telephone, laptop computer, digital broadcast receiver, PDA (personal digital assistant), PAD (tablet computer), PMP (portable multimedia player), in-vehicle terminal (e.g., in-vehicle navigation terminal), and a fixed terminal such as a digital TV, or a desktop computer. The server shown in FIG. 8 is merely an example and should not impose any limitation on the functions and scope of use of the embodiments of the present disclosure.

As shown in FIG. 8, the electronic device 800 may include a processing apparatus (for example, a central processing unit, a graphics processor, etc.) 801, which may execute various appropriate actions and processes in accordance with a program stored in a read-only memory (ROM) 802 or a program loaded into a random access memory (RAM) 803 from a storage apparatus 808. In the RAM 803, various programs and data required for the operation of the electronic device 800 are also stored. The processing apparatus 801, the ROM 802, and the RAM 803 are connected to each other through a bus 804. An input/output (I/O) interface 805 is also connected to the bus 804.

Typically, the following apparatuses may be connected to the I/O interface 805: an input apparatus 806 including such as a touch screen, a touch pad, a keyboard, a mouse, a camera, a microphone, an accelerometer, or a gyroscope; an output apparatus 807 including such as a liquid crystal display (LCD), a speaker, a vibrator; the storage apparatus 808 including such as a magnetic tape, a hard disk; and a communication apparatus 809. The communication apparatus 809 may allow the electronic device 800 to perform wireless or wired communication with other devices to exchange data. Although FIG. 8 shows the electronic device 800 having various apparatuses, it should be understood that it is not required to implement or have all the illustrated apparatuses. It may alternatively be implemented or provided with more or fewer apparatuses. Each block shown in FIG. 8 may represent one apparatus, or may represent a plurality of apparatuses as needed.

In particular, according to embodiments of the present disclosure, the process described above with reference to the flow chart may be implemented in a computer software program. For example, an embodiment of the present disclosure includes a computer program product, which comprises a computer program that is hosted in a machine-readable medium. The computer program comprises program codes for executing the method as illustrated in the flow chart. In such an embodiment, the computer program may be downloaded and installed from a network via the communication portion 809, or may be installed from the storage portion 808, or may be installed from the ROM 802.

The computer program, when executed by the central processing unit (CPU) 801, implements the above mentioned functionalities as defined by the methods of the present disclosure.

It should be noted that the computer readable medium in embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any tangible medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The above computer readable medium may be included in the electronic device, or a stand-alone computer readable medium not assembled into the electronic device. The computer readable medium carries one or more programs. The one or more programs, when executed by the electronic device, cause the electronic device to: acquire feature maps, the feature maps being obtained by means of performing text instance segmentation on an image of a to-be-recognized text; construct a relationship graph according to the feature maps, where in the relationship graph: each node represents a pixel in a feature map, each edge represents that a similarity of spatial semantic features of two nodes connected by the edge is greater than a target threshold, and a spatial semantic feature of a node includes a position feature and a type feature of a pixel represented by the node; process the relationship graph using a pre-trained graph convolutional network, to obtain a first text feature corresponding to the image; and generate a text recognition result of the image based on the first text feature.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In the circumstance involving a remote computer, the remote computer may be connected to a user's computer through any network, including local area network (LAN) or wide area network (WAN), or may be connected to an external computer (for example, connected through Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, may be described as: a processor including a feature map acquisition unit, a relationship graph construction unit, a graph convolutional processing unit and a recognition unit. Here, the names of these units do not in some cases constitute limitations to such units themselves. For example, the feature map acquisition unit may also be described as "a unit configured to acquire feature maps, the feature maps being obtained by means of performing text instance segmentation on an image of a to-be-recognized text".

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for recognizing a text, the method comprising:
   acquiring feature maps, the feature maps being obtained by means of performing text instance segmentation on an image of a to-be-recognized text;
   constructing a relationship graph according to the feature maps, wherein in the relationship graph: each node represents a pixel in a feature map, each edge represents that a similarity of spatial semantic features of two nodes connected by the edge is greater than a target threshold, and a spatial semantic feature of a node comprises a position feature and a type feature of a pixel represented by the node;

processing the relationship graph using a pre-trained graph convolutional network, to obtain a first text feature corresponding to the image; and generating a text recognition result of the image based on the first text feature.

2. The method according to claim 1, wherein the method further comprises:

processing the feature maps using a pre-trained language model, to obtain a second text feature corresponding to the image; and the generating a text recognition result of the image based on the first text feature, comprises:

generating the text recognition result of the image, based on the first text feature and the second text feature.

3. The method according to claim 2, wherein the generating the text recognition result of the image, based on the first text feature and the second text feature, comprises:

generating the text recognition result of the image based on the first text feature, the second text feature, and the feature maps.

4. The method according to claim 3, wherein the feature maps are at least two feature maps; and the constructing a relationship graph according to the feature maps, comprises:

constructing, for each feature map in the at least two feature maps, a relationship subgraph corresponding to the feature map; and merging relationship subgraphs corresponding to the feature maps to obtain the relationship graph.

5. The method according to claim 4, wherein a feature map in the at least two feature maps is used to represent an image feature of an image area in which a word of the to-be-recognized text is located and a sequential feature between the feature map and other feature maps.

6. The method according to claim 5, wherein each feature map is generated through following steps:

inputting the image to a convolutional neural network trained in advance to obtain an initial feature map;

performing text instance segmentation on the initial feature map to obtain instance feature maps;

performing text sequence segmentation on the initial feature map to obtain sequential feature maps; and fusing the instance feature maps and the sequential feature maps to obtain the feature maps obtained by means of performing text instance segmentation on the image of the to-be-recognized text.

7. The method according to claim 6, wherein the convolutional neural network is implemented based on a feature pyramid network and a residual network, wherein a step size of at least one convolutional layer preceding to an output layer of the residual network is 1, and a feature map output by the residual network is subject to deformable convolution to generate an input feature map of the feature pyramid network.

8. The method according to claim 2, wherein the processing the feature maps using a pre-trained language model to obtain a second text feature corresponding to the image, comprises:

processing the feature maps using a semantic feature extraction network trained in advance to obtain a semantic feature corresponding to the feature maps, wherein the semantic feature extraction network comprises a pooling layer that performs pooling processing on the feature maps and a linear layer that performs linear transformation on an output of the pooling layer; and inputting the semantic feature to the language model to obtain the second text feature.

9. The method according to claim 3, wherein the generating the text recognition result of the image, based on the first text feature, the second text feature, and the feature maps, comprises:

inputting the first text feature, the second text feature, and the feature maps to a pre-trained feature fusion network to generate the text recognition result of the image, wherein the feature fusion network is used for splicing the first text feature, the second text feature, and the feature maps, and performing linear transformation on a result obtained by the splicing to obtain the text recognition result of the image.

10. The method according to claim 4, wherein the spatial semantic feature of the node further comprises a sequential feature of a feature map in which the pixel represented by the node is located; and for a node in a relationship subgraph, a spatial semantic feature of the node is generated through following operations:

acquiring a sequence value of a feature map corresponding to the node in the at least two feature maps;

determining, based on the sequence value, the sequential feature of the feature map corresponding to the node; and splicing the position feature, the type feature, and the sequential feature of the pixel represented by the node to obtain the spatial semantic feature of the node.

11. The method according to claim 4, wherein a similarity of spatial semantic features of two nodes is determined through following operations:

determining an Euclidean distance between the two nodes, and determining a first similarity based on the Euclidean distance;

determining a cosine similarity of the type features corresponding to the two nodes; and determining the similarity of spatial semantic features of the two nodes, based on the first similarity and the cosine similarity.

12. The method according to claim 4, wherein the merging relationship subgraphs corresponding to the feature maps, comprises:

connecting root nodes of neighboring relationship subgraphs in sequence according to a sequential relationship between the relationship subgraphs.

13. The method according to claim 12, wherein a root node of a feature map is determined through following operations:

determining, for a node in the feature map, an intersection and concatenation ratio between the node and each of other nodes, respectively, wherein the intersection and concatenation ratio represents a ratio of a number of elements included in an intersection of neighboring nodes of two nodes to a number of elements included in a concatenation of the neighboring nodes of the two nodes; and in response to determining that respective intersection and concatenation ratios corresponding to the node are not greater than a preset threshold, determining the node as the root node.

14. The method according to claim 4, wherein the graph convolutional network comprises a first graph convolutional network and an output network, wherein the first graph convolutional network is used for transforming a feature matrix of the relationship graph, and the output network is used for selecting nodes from the respective relationship subgraphs based on an output of the first graph convolutional network, and aggregating transformed features corresponding to the nodes selected from the respective relationship subgraphs to obtain the first text feature.

15. The method according to claim 14, wherein the first graph convolutional network comprises a first graph convolutional subnetwork and a second graph convolutional subnetwork, wherein the first graph convolutional subnetwork is used for transforming the feature matrix of the relationship graph, and the second graph convolutional subnetwork is used for transforming, according to a relationship graph constructed based on an output of the first graph convolutional subnetwork, a feature matrix output by the first graph convolutional subnetwork.

16. The method according to claim 6, wherein the performing text instance segmentation on the initial feature map to obtain instance feature maps, comprises: performing text instance segmentation on the initial feature map using a pre-trained text instance segmentation network to obtain the instance feature maps; and the performing text sequence segmentation on the initial feature map to obtain sequential feature maps, comprises: performing text sequence segmentation on the initial feature map using a pre-trained text sequence segmentation network to obtain the sequential feature maps; and the graph convolutional network, the language model, and the segmentation network are obtained by training through following operations, wherein the segmentation network comprises the convolutional neural network, the text instance segmentation network and the text sequence segmentation network:

acquiring a labeled training dataset and an unlabeled training dataset, wherein training data in the labeled training dataset comprises labels of different granularities; and constructing a teacher-student network corresponding to the graph convolutional network, the language model, and the segmentation network, and training the teacher-student network using the labeled training dataset, the unlabeled training dataset, and a preset loss function, wherein an input to the student network comprises labeled training data and unlabeled training data, and an input to the teacher network comprises the unlabeled training data, the loss function comprises a first loss function, a second loss function, and a third loss function, the first loss function and the second loss function respectively represent differences between output results of the student network for the labeled training data and the labels of different granularities, and the third loss function represents differences between output results of the student network and output results of the teacher network for the unlabeled training data, respectively.

17. An apparatus for recognizing a text, the apparatus comprising:

one or more processors; and a storage apparatus, storing one or more programs thereon, the one or more programs, when executed by the one or more processors, cause the one or more processors to implement operations, the operations comprising:

acquiring feature maps, the feature maps being obtained by means of performing text instance segmentation on an image of a to-be-recognized text;

constructing a relationship graph according to the feature maps, wherein in the relationship graph: each node represents a pixel in a feature map, each edge represents that a similarity of spatial semantic features of two nodes connected by the edge is greater than a target threshold, and a spatial semantic feature of a node comprises a position feature and a type feature of a pixel represented by the node;

processing the relationship graph using a pre-trained graph convolutional network, to obtain a first text feature corresponding to the image; and generating a text recognition result of the image based on the first text feature.

18. A non-transitory computer readable medium, storing a computer program thereon, wherein, the program, when executed by a processor, implements operations, the operations comprising:

acquiring feature maps, the feature maps being obtained by means of performing text instance segmentation on an image of a to-be-recognized text;

constructing a relationship graph according to the feature maps, wherein in the relationship graph: each node represents a pixel in a feature map, each edge represents that a similarity of spatial semantic features of two nodes connected by the edge is greater than a target threshold, and a spatial semantic feature of a node comprises a position feature and a type feature of a pixel represented by the node;

processing the relationship graph using a pre-trained graph convolutional network, to obtain a first text feature corresponding to the image; and generating a text recognition result of the image based on the first text feature.

* * * * *